US011222182B2

(12) United States Patent
Watanabe et al.

(10) Patent No.: US 11,222,182 B2
(45) Date of Patent: Jan. 11, 2022

(54) SERVER DEVICE, SERVICING METHOD, AND PROGRAM

(71) Applicant: Rakuten Group, Inc., Tokyo (JP)

(72) Inventors: Tetsu Watanabe, Tokyo (JP); Takumi Umemura, Tokyo (JP); Keigo Tsuchiya, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 16/648,740

(22) PCT Filed: Dec. 13, 2018

(86) PCT No.: PCT/JP2018/045810
§ 371 (c)(1),
(2) Date: Mar. 19, 2020

(87) PCT Pub. No.: WO2020/121467
PCT Pub. Date: Jun. 18, 2020

(65) Prior Publication Data
US 2021/0216718 A1 Jul. 15, 2021

(51) Int. Cl.
*G06F 40/30* (2020.01)
*H04L 12/58* (2006.01)

(52) U.S. Cl.
CPC .............. *G06F 40/30* (2020.01); *H04L 51/02* (2013.01)

(58) Field of Classification Search
CPC .......... G06F 40/30; G06F 40/35; G06F 13/00; H04L 51/02; H04L 51/046; G06Q 10/1095; G06Q 10/1091; G06Q 50/30; H04W 4/20
See application file for complete search history.

(56) References Cited

U.S. PATENT DOCUMENTS

2010/0268681 A1* 10/2010 Guo .................. G06Q 10/10
706/54
2013/0332543 A1 12/2013 Shin et al.
(Continued)

FOREIGN PATENT DOCUMENTS

EP         3327577 A1    5/2018
JP     2008-250889 A    10/2008
(Continued)

OTHER PUBLICATIONS

International Search Report for PCT/JP2018/045810 dated Jan. 15, 2019 [PCT/ISA/210].

*Primary Examiner* — Soe Hlaing
(74) *Attorney, Agent, or Firm* — Sughrue Mion, PLLC

(57) ABSTRACT

A receiving unit (310) receives a message transmitted from any one of the users that are talk targets. The interpreter (341) attempts to interpret, as an answer to a question, the message received by the receiving unit (310). A collector (342) collects, upon success of the attempt made by the interpreter (341), the interpreted answer as the answer from the user who sends the message. When a predetermined requirement is satisfied in a state where a yet-to-respond user whose answer is not yet collected by the collector (342) is present, an inquiry transmitter (321) transmits an inquiry about the question to at least the yet-to-respond user among the users. A result transmitter (322), after the answers are collected from all of the users, transmits to the users a message indicating a result obtained by tallying the answers.

8 Claims, 10 Drawing Sheets

(56) References Cited

U.S. PATENT DOCUMENTS

| | | | |
|---|---|---|---|
| 2018/0152411 A1 | 5/2018 | Lee et al. | |
| 2018/0351899 A1 | 12/2018 | Kano et al. | |
| 2019/0347319 A1* | 11/2019 | Goyal | G10L 15/32 |
| 2020/0044998 A1* | 2/2020 | Jeon | G06Q 30/0252 |

FOREIGN PATENT DOCUMENTS

| | | |
|---|---|---|
| JP | 2018-129064 A | 8/2018 |
| KR | 1020160129472 A | 11/2016 |
| KR | 1020180113812 A | 10/2018 |
| WO | 2017/018016 A1 | 2/2017 |
| WO | 2017018016 A1 | 2/2017 |

\* cited by examiner

SERVER DEVICE, SERVICING METHOD, AND PROGRAM

CROSS REFERENCE TO RELATED APPLICATIONS

This application is a National Stage of International Application No. PCT/JP2018/045810 filed Dec. 13, 2018.

TECHNICAL FIELD

The present invention relates to a server device, a servicing method, and a program.

BACKGROUND ART

In recent years, messaging services using user terminals such as a smartphone has been widespread. The messaging service enables the transmission and reception of a message between users in real time.

In such a messaging service, attempts are made not only to allow the transmission and reception of the message between the users, but also to provide the users with more convenient services. For example, Patent Literature 1 discloses the invention of a messaging service that enables the transmission and reception of data, between the users, of a linked application such as, for example, a card application, a camera application, a schedule application, a game application, a photo album application, and a calendar application.

CITATION LIST

Patent Literature

Patent Literature 1: Unexamined Japanese Patent Application Kokai Publication No. 2018-129064

SUMMARY OF INVENTION

Technical Problem

In the invention of the above described Patent Literature 1, each user is requested to vote on a date of a drinking party by transmitting and receiving data of a schedule application among users.

However, in the invention of Patent literature 1, any one of the users is required to create data of the schedule application, and this is inefficient. Furthermore, any one of the users is required to, for example, at least tally a vote result or send a reminder to a user whose vote is pending, and this is similarly inefficient.

Given this situation, there has been a need for technology by which answers to a question from all of the users are effectively collected through the exchange of messages in the messaging service.

An objective of the present invention in view of the above circumstances is to provide a server device, a servicing method, and a program that allow efficient collection of the answers to the question from all of the users.

Solution to Problem

In order to attain the aforementioned objective, a server device according a first aspect of the present invention is a server device providing a bot in a messaging service where a message transmitted to or received from users and the bot is shared, the bot being configured to set a question, the server device comprising:

a receiving unit configured to receive the message transmitted from any one of the users;

an interpreter configured to attempt to interpret the received message as an answer to the question;

a collector configured to, upon success of the attempt, collect the interpreted answer as an answer from, among the users, a user who sends the message that is received;

an inquiry transmitter configured to, when a predetermined requirement is satisfied in a state where a yet-to-respond user is present, transmit an inquiry about the question to, among the users, at least the yet-to-respond user whose answer is not yet collected by the collector; and a result transmitter configured to, after the answers are collected from all of the users, transmit a message, to the users via the messaging service, indicating a result obtained by tallying the answers.

Furthermore, in the server device according to the above first aspect, the inquiry transmitter transmits the inquiry to the yet-to-respond user when the attempt to interpret the message that is transmitted from the yet-to-respond user is not succeeding successively, and (i) a number of messages not succeeding successively, or (ii) an amount of the messages not succeeding successively, exceeds a threshold.

Still further, in the server device according to the above first aspect, wherein, upon transmission of the inquiry, the number of messages not succeeding successively, or the amount of the messages not succeeding successively is cleared.

The server device according to the above first aspect, wherein when a frequency of transmission of the message through the messaging service by the yet-to-respond user is lower than a standard value, the inquiry transmitter transmits the inquiry to the yet-to-respond user.

The server device according to the above first aspect, wherein the inquiry transmitter transmits the inquiry to the yet-to-respond user via another messaging service that is different from the messaging service.

The server device according to the above first aspect, wherein, when the yet-to-respond user is not signed in to the messaging service, the inquiry transmitter transmits the inquiry to the yet-to-respond user via the other messaging service that is different from the messaging service.

The server device according to the above first aspect, further configured to include:

an acquirer configured to acquire, when the bot participates in the messaging service, the message transmitted to or received from the users before the participation; and a setter configured to set the question based on the acquired message.

In order to attain the aforementioned objective, a servicing method according to a second aspect of the present invention performed by a server device that provides a bot in a messaging service where a message transmitted to or received from users and the bot is shared, the bot being configured to set a question, the servicing method includes:

a step of receiving in which the server device receives the message transmitted from any one of the users;

a step of interpreting in which the server device attempts to interpret the received message as an answer to the question;

a step of collecting in which, upon success of the attempt, the server device collects the interpreted answer as an answer from, among the users, a user who sends the message that is received;

a step of inquiry-transmitting in which the server device, when a predetermined requirement is satisfied in a state where a yet-to-respond user is present, transmits an inquiry about the question to, among the users, at least a yet-to-respond user whose answer is not yet collected by the collector; and a step of result-transmitting in which the server device, after the answers are collected from all of the users, transmits a message, to the users via the messaging service, indicating a result obtained by tallying the answers.

In order to attain the aforementioned objective, program according a third aspect of the present invention for causing a computer that provides a bot in a messaging service where a message transmitted to or received from users and the bot is shared, the bot being configured to set a question, to function as:

a receiving unit configured to receive the message transmitted from any one of the users;

an interpreter configured to attempt to interpret the received message as an answer to the question;

a collector configured to, upon success of the attempt, collect the interpreted answer as an answer from, among the users, a user who sends the message that is received;

an inquiry transmitter configured to, when a predetermined requirement is satisfied in a state where a yet-to-respond user is present, transmit an inquiry about the question to, the users, at least a yet-to-respond user whose answer is not yet collected by the collector; and a result transmitter configured to, after the answers are collected from all of the users, transmit a message, to the users via the messaging service, indicating a result obtained by tallying the answers.

The above program may be distributed or sold via a computer communication network, separately from the computer on which the program is executed.

An information recording medium having the above program recorded thereon is a non-transitory recording medium, and may be distributed or sold separately from the computer. Here, the non-transitory recording medium refers to a tangible recording medium. Examples of the non-transitory recording medium include a compact disk, a flexible disk, a hard disk, a magneto-optical disk, a digital video disk, a magnetic tape, and a semiconductor memory. Furthermore, a temporary (transitory) recording medium refers to a transmission medium (transmission signal) itself. Examples of the temporary recording medium include electrical signals, optical signals and electromagnetic waves. Note that a temporary storage area is an area for temporary storing data and a program and thus refers to a volatile memory such as a random access memory (RAM).

Advantageous Effects of Invention

The present invention enables efficient collection of the answers to a question from all of the users.

DESCRIPTION OF EMBODIMENTS

Embodiments of the present invention are described below. The embodiments of the present invention describe a messaging system as an example that enables transmission and reception of messages between users in real time. Note that the embodiments described below are for explanatory purposes and not for limiting the scope of the present invention. Thus, a person of ordinary skill in the art is able to adopt an embodiment in which any of the elements or all of the elements are replaced with equivalent elements, and such an embodiment is considered to be falling within the scope of the present invention.

Entire Configuration

Figure 1:
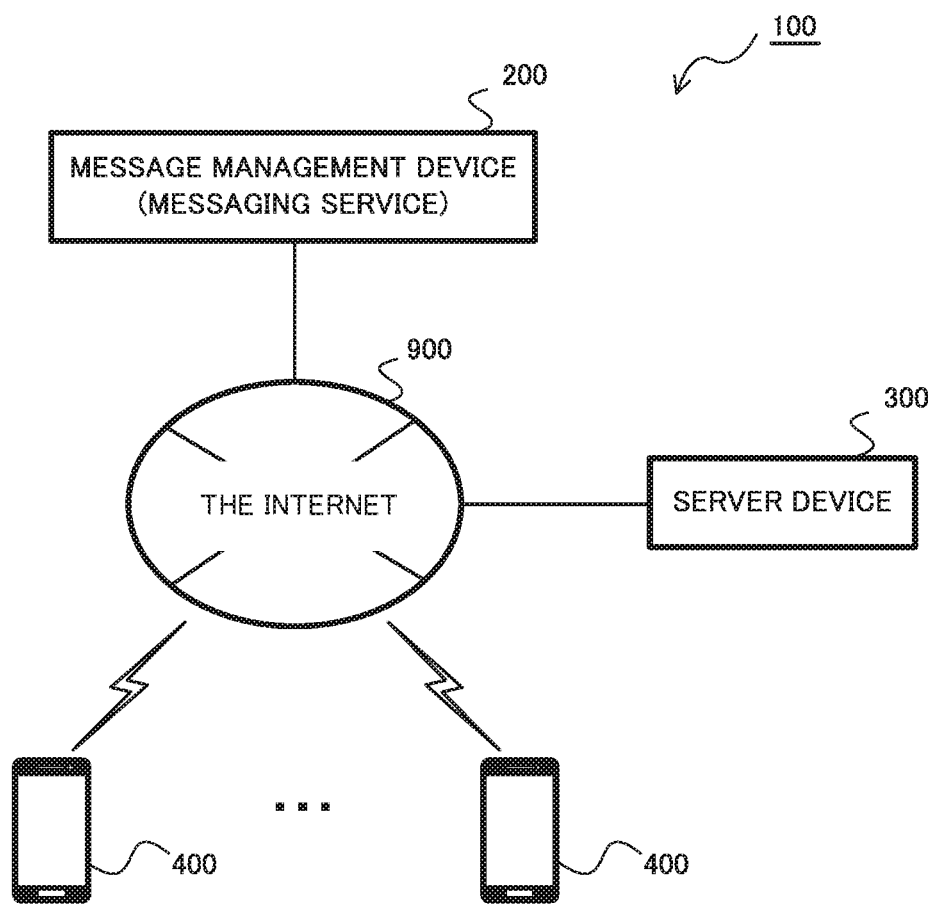
FIG. 1 is a block diagram illustrating an example of an entire configuration of a messaging system according to the present embodiment.

A messaging system 100 according to an embodiment of the present invention includes, as illustrated in FIG. 1, communicably interconnects through the Internet 900 a message management device 200 that provides the messaging service, a server device 300 that provides a bot in a messaging service, and user terminals 400 that use the messaging service. Note that this connection configuration is an example and that there may be other connection configurations. For example, the server device 300 may be directly connected to the message management device 200.

The message management device 200 is a device that provides the messaging service in which messages transmitted to or received from the users and the bot are shared. For example, the message management device 200 transmits a message sent from one user terminal 400 to another user terminal 400 that is the talk target and to the server device 300. Furthermore, the message management device 200 transmits a message that is sent from the server device 300 to the user terminals 400 that are talk targets.

The server device 300 is a device that provides the bot (a robot organizer) that arranges an event (for example, a drinking party, a golf outing, a farewell and a welcome party) in which the users are to participate. For example, the server device 300 is invited by the users participating in multi-person talk or group talk through the messaging service to join a conversation as the bot. Then, the server device 300 transmits, for example, an inquiry message to appropriately prompt the users to make a statement (transmit a message) for arrangement of a date or the like for an event.

The user terminal 400 is a terminal used by the user who uses the messaging service. Examples of the user terminal 400 include a smartphone and a tablet in which a message application, that is, an application that enables use of the messaging service, is installed in advance. The user terminal 400 of any one of the users participating in the multi-person talk or the group talk invites the server device 300 that is the bot to arrange, for example, the date of an event.

General Configuration of Information Processing Device

A typical information processing device 500 in which the message management device 200, the server device 300, and the user terminal 400 according to an embodiment of the present invention are achieved is described.

Figure 2:
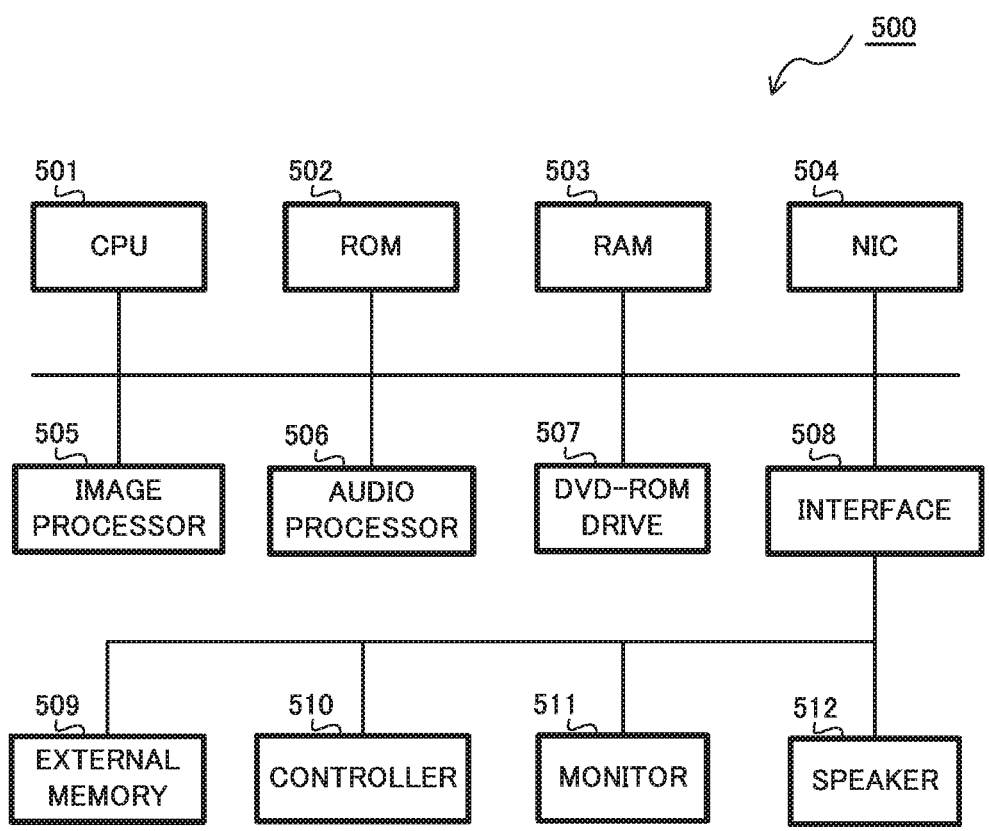
FIG. 2 is a block diagram illustrating an example of a general configuration of a typical information processing device in which a message management device, a server device and a user terminal are achieved.

The information processing device 500 includes, as illustrated in FIG. 2, a central processing unit (CPU) 501, a read only memory (ROM) 502, a random access memory (RAM) 503, a network interface card (NIC) 504, an image processor 505, an audio processor 506, a digital versatile disc ROM (DVD-ROM) drive 507, an interface 508, an external memory 509, a controller 510, a monitor 511, and a speaker 512.

The CPU 501 controls the entire operation of the information processing device 500, and exchanges control signals and data with, and is connected to, each structural element.

An initial program loader (IPL) that is executed immediately after power-on is recorded in the ROM 502. By executing the IPL, the predetermined program is read into the RAM 503, and execution of the program by the CPU 101 commences. Furthermore, the ROM 502 stores programs and various kinds of data for an operating system necessary for controlling the entire operation of the information processing device 500.

The RAM 503 is for temporarily storing data and/or programs, and retains, for example, the program and/or data read out from the DVD-ROM, as well as data needed for other communication.

The NIC 504 serves to connect the information processing device 500 to a computer communications network such as the Internet. The NIC 504 may conform to the 10BASE-T/100BASE-T standard used when forming a local area network (LAN), or alternatively, the NIC 504 may include a modem, such as an analog modem for connecting to the Internet using a telephone circuit, an integrated services digital network (ISDN) modem, an asymmetric digital subscriber line (ADSL) modem, or a cable modem for connecting to the Internet using a cable television circuit, as well as an interface (not shown) that interfaces between the CPU 501 and any one of the above modems.

The image processor 505 processes data read from the DVD-ROM or the like by using the CPU 501 and/or an image operation processor (not shown) provided in the image processor 505, and then records the thus obtained data in frame memory (not shown) provided in the image processor 505. The image information recorded in the frame memory is then converted into a video signal at a predetermined synchronous timing, and output to the monitor 511. This enables the display of various pages.

The audio processor 506 converts audio data read out from the DVD-ROM or the like into an analog audio signal, and then causes the analog audio signal to be output from a speaker 512 connected thereto. In addition, under control of the CPU 501, the audio processor 506 also generates sound to be generated as the process performed by the information processing device 500 progresses, and then causes a speaker 512 to output sounds corresponding thereto.

Recorded on the DVD-ROM loaded into the DVD-ROM drive 507 is, for example, the program for achieving the server device 300 or the like according to the embodiment. Under the control of the CPU 501, the DVD-ROM drive 507 conducts processing to read out the necessary program and/or data from the DVD-ROM loaded therein. The information so read out is then temporarily stored in the RAM 503 or similar memory.

The external memory 509, the controller 510, the monitor 511, the speaker 512 are each detachably connected to the interface 508.

Data on personal information of the user is stored in the external memory 509 in a rewritable manner.

The controller 510 receives operation input made when setting various types of settings for the information processing device 500. By inputting a command via the controller 510, the user of the information processing device 500 can appropriately record such data on the external memory 509.

The monitor 511 presents data output from the image processor 505 to the user of the information processing device 500.

The speaker 512 presents audio data output from the audio processor 506 to the user of the information processing device 500.

In addition, the information processing device 500 may also be configured to use a large-capacity external storage device such as a hard disk to perform functions equivalent to components such as the ROM 502, the RAM 503, the external memory 509 and the DVD-ROM or the like stored in the DVD-ROM drive 507.

Hereinafter, a configuration or the like of the server device 300 to be achieved in the above information processing device 500 is described with reference to FIGS. 3 to 7. Upon powering on the information processing device 500, the program that causes the information processing device 500 to function as the server device 300 according to the present embodiment is executed, and the server device 300 according to the present embodiment is achieved. Note that the message management device 200 and the user terminal 400 are similarly achieved in the information processing device 500. Such configurations are omitted while the most characteristic configuration of the server device 300 in the present embodiment is described below.

General Configuration of Server Device

Figure 3:
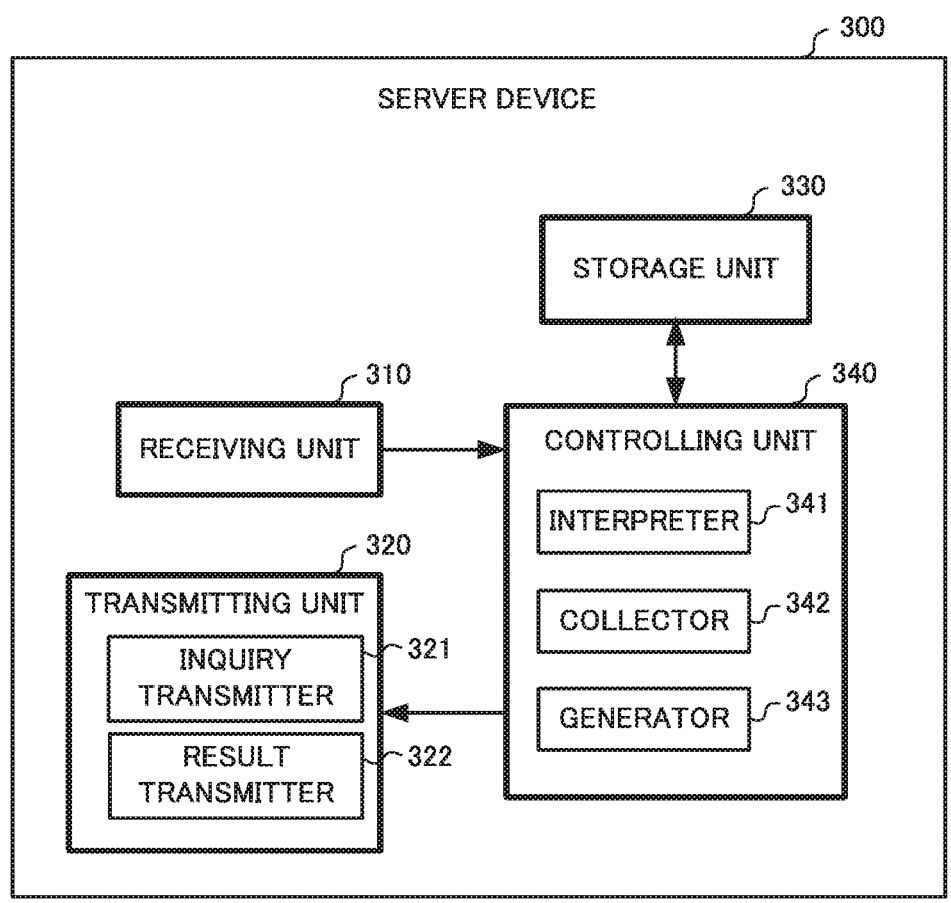
FIG. 3 is a block diagram illustrating an example of a general configuration of the server device according to the present embodiment.

FIG. 3 is a block diagram illustrating an example of a general configuration of the server device 300 according to the present embodiment. As illustrated, the server device 300 includes a receiving unit 310, a transmitting unit 320, a storage unit 330, and a controlling unit 340.

The receiving unit 310 receives a message transmitted from any one of the users. For example, the server device 300 is invited as the bot during the multi-person talk or the group talk. After the invitation, the receiving unit 310 receives the message transmitted from the user terminal 400 participating in the multi-person talk or group talk. More specifically, the message transmitted from the user terminal 400 is sent to the message management device 200, and then, the thus sent message is transmitted from the message management device 200 to the server device 300 and the other user terminal 400 that is the talk target. With this configuration, the receiving unit 310 receives the message transmitted from the user terminal 400 via the message management device 200.

The above described MC 504 or the like can function as this type of the receiving unit 310.

The transmitting unit 320 transmits various types of messages that are directed to the user terminal 400 as the talk target. Usually, the message transmitted from the transmitting unit 320 is sent to the message management device 200, and then the thus sent message is transmitted to multiple user terminals 400 as the talk targets from the message management device 200. That is, the transmitting unit 320 transmits the message to the target user terminal 400 via the messaging service provided by the message management device 200. In addition, the transmitting unit 320 is configured to transmit the message to the target user terminal 400 via other messaging services such as an e-mail and a short message service (SMS). At this time, the address of the e-mail or the SMS can be acquired from the message management device 200. The transmitting unit 320 includes an inquiry transmitter 321 that transmits an inquiry message and a result transmitter 322 that transmits an arrangement result.

The inquiry transmitter 321 transmits an inquiry about a question to at least a yet-to-respond user whose answer is not yet given. For example, when the server device 300 is invited as the bot, the inquiry transmitter 321 transmits the initial message to all of the user terminals 400 as the talk targets. As described later, this initial message is the first message sending to the user an inquiry about the contents to be arranged by the server device 300. Then, when content to be arranged is determined, the inquiry transmitter 321 transmits the inquiry message to all of the user terminals 400 as the talk targets. This inquiry message is a message that, as described later, sends to the user an inquiry about convenient dates, inconvenient dates, or the like. When the predetermined condition is satisfied in the state where the yet-to-respond user is present, the inquiry transmitter 321 transmits the inquiry message to the user terminal 400 of the yet-to-respond user. The predetermined condition is, for example, a condition to determine that the answer from the yet-to-respond user is difficult to obtain. When the predetermined condition is satisfied, the inquiry transmitter 321 first transmits the inquiry message via the messaging service provided by the message management device 200, then transmits the inquiry message to the user terminal 400 of the yet-to-respond user via other messaging services. For example, when the yet-to-respond user transmits a message via the message management device 200 at a frequency lower than a standard value, the inquiry transmitter 321 first transmits the inquiry message via the messaging service. When the frequency that the yet-to-respond user transmits a message through the messaging service remains still lower than the standard value, the inquiry transmitter 321 transmits the inquiry message to the user terminal 400 of the yet-to-respond user via other messaging services. The inquiry transmitter 321 may be configured to, when the yet-to-respond user is not signed in to the messaging service (message management device 200), immediately transmit the inquiry message to the user terminal 400 of the yet-to-respond user via other messaging services. In such cases, the server device 300 may transmit such a message that causes, on the user terminal 400, a push notification for promoting an answer through the messaging service, in addition to or in place of the inquiry that is made through other messaging services. For example, when the messaging application has a function for causing a push notification upon reception of the message including an account ID, the server device 300 (the inquiry transmitter 321) may transmit an inquiry message including the account ID or the like of the yet-to-respond user.

Figure 4:
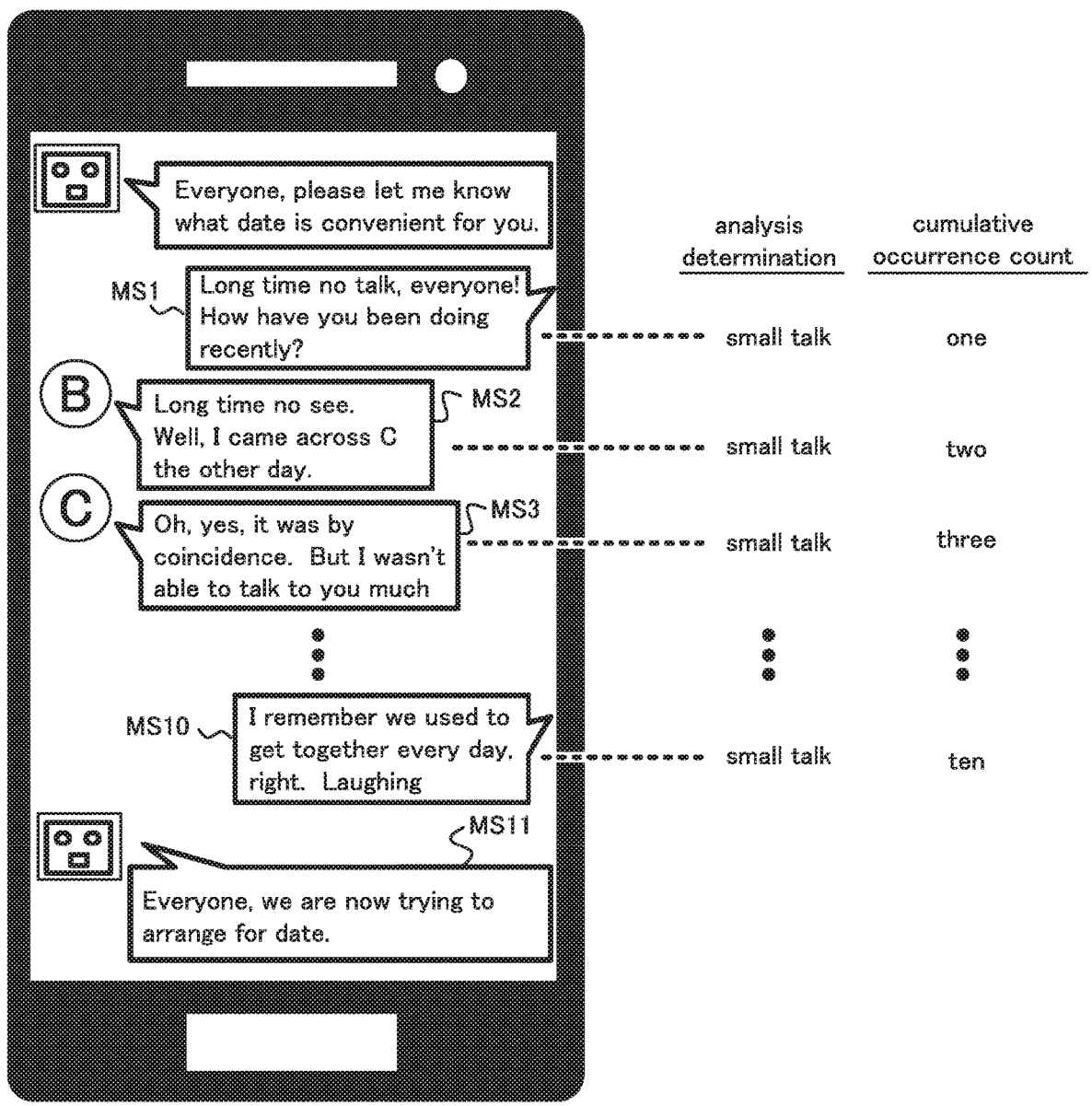
FIG. 4 is a schematic view for describing a case of analysis of a message not succeeding successively.

In addition, when the attempts to interpret the messages are not succeeding successively in the controlling units 340 (the later-described interpreter 341), the inquiry transmitter 321 may transmit the inquiry message to the user terminal 400 of the yet-to-respond user. For example, as illustrated in FIG. 4, when the attempts to interpret the messages MS1, MS2, MS3 . . . , MS10 are not succeeding 10 times consecutively, an inquiry message MS11 is transmitted. That is, the attempts not succeeding to interpret the messages consecutively may indicate that the subject of a conversation deviates from the inquiry content to be answered. Thus, sending the inquiry message brings the subject of the conversation back to the inquiry content to be answered. When an answer is not received after sending such an inquiry message (for example, when a predetermined period elapses without receiving any answer), and when an answer is determined to be difficult to receive through the messaging service as described above, the inquiry transmitter 321 transmits the inquiry message to the user terminal 400 of the yet-to-respond user via the other messaging services. In addition, as illustrated in FIG. 4, instead of determining the number of the attempts not succeeding successively made to interpret the messages (the number of messages not succeeding successively), the amount of the messages not succeeding successively (for example, the number of characters included in the messages, and the height of the messages shown on the screen) can be determined. For example, when the attempts to interpret the messages are not succeeding successively, and when the amount of the messages not succeeding successively exceeds the threshold value, the inquiry transmitter 321 may similarly transmit the inquiry message to the user terminal 400 of the yet-to-respond user. In this case, since the attempts to interpret the message are not succeeding successively and the amount of the messages, in that period, exceeds the threshold, the subject of the conversation may be on the verge of veering from the inquiry content to be answered. Thus, sending the inquiry message brings the subject of the conversation back to the inquiry content to be answered. In addition, when the answer cannot be received after sending the inquiry message in the manner described above, and when the answer is determined to be difficult to be received via the messaging service as described above, the inquiry transmitter 321 transmits the inquiry message to the user terminal 400 of the yet-to-respond user via the other messaging services. Then, after transmittance of the inquiry message, the controlling unit 340 may clear the number of messages not succeeding successively or the amount of the messages not succeeding successively.

Again with reference to FIG. 3. The result transmitter 322 transmits the arrangement result to all of the user terminals 400 as the talk targets when the controlling unit 340 (the later-described collector 342) collects the answer from all of the users as the talk targets. For example, the result transmitter 322 transmits, to all of the user terminals 400, a result message having the arranged date or the like for the event.

The above-described NIC 504 or the like can function as a transmitting unit 320 as described above.

The storage unit 330 stores various kinds of information to be used for arrangement.

Figure 5A:
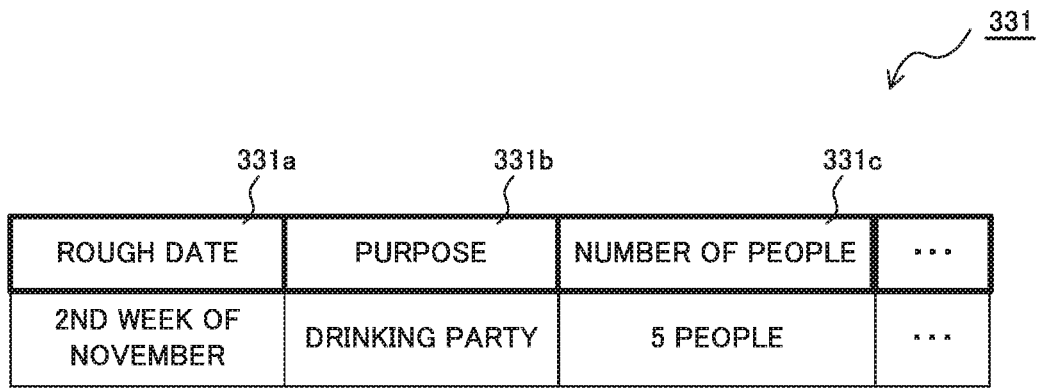
FIG. 5A is a schematic view of an example of arrangement setting information.

For example, the storage unit 330 stores arrangement setting information 331 as described in FIG. 5A. The arrangement setting information 331 is information for setting the content the server device 300 is to arrange.

Furthermore, as described later, the arrangement setting information 331 is stored in the storage unit 330 in response to the initial message. The arrangement setting information 331 includes a rough date 331a, a purpose 331b, and a number of people 331c.

The rough date 331a is an estimated date for holding an event and is indicated as "Month n", "Month n Week m", or the like. As described later, when the user gives an answer to the initial message, for example, "this month" or "next week", the "this month" or the "next week" is converted into "Month n" or "Month n Week m" based on the point of time of the answer.

The purpose 331b is the purpose of the event, and is indicated as a golf outing, drinking party, a welcome party, a farewell party or the like. When the user gives an answer, for example, "go for a drink" in response to the initial message, the "go for a drink" is converted into the general "drinking party".

The number of people 331c is the number of people who participate in the event, and is indicated as p people (where p is 2 or more), or the like. When the user answers, for example, "5 people" or "5 persons", "5 persons" is converted into a general notation "5 people".

Figure 5B:
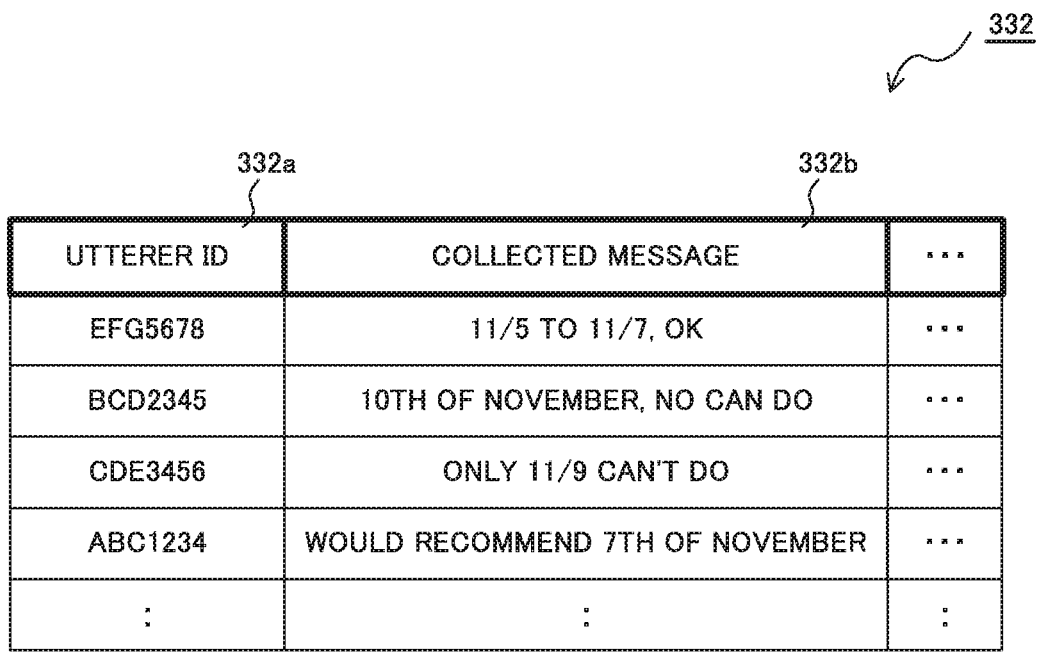
FIG. 5B is a schematic view of an example of a collected message group.

Furthermore, the storage unit 330 stores a collected message group 332 as illustrated in FIG. 5B. The collected message group 332 is, as described later, stored in the storage unit 330 depending on an answer from each user in response to the inquiry message. The collected message group 332 includes an utterer ID 332a and a collected message 332b.

The utterer ID 332a is information for identifying the user who makes a statement (transmits the message).

The collected message 332b is a message collected as a result of a successful attempt by a controlling unit 340 (the later-described interpreter 341) to attempt an interpretation of the message.

The above described RAM 503, the external memory 509 or the like can function as a storage unit 330 as described above.

Again with reference to FIG. 3, the controlling unit 340 controls the entirety of the server device 300. The controlling unit 340 includes an interpreter 341, a collector 342, and a generator 343.

The interpreter 341 makes the attempt, by using artificial intelligence (AI) or the like, to interpret the message as the answer to the question received by the receiving unit 310. For example, the interpreter 341 interprets whether an effective date or an effective date range is included in the received message that is in response to the inquiry message that inquires about a convenient date. Furthermore, the interpreter 341 also interprets whether a term-expression indicating "affirmative", "negative", or "put on hold" is included in the messages, in addition to the effective date or the effective date range. The examples of the term-expression indicating "affirmative" include "OK", "fine", "good", "would recommend", and "o". The examples of the term-expression indicating "negative" include "no can do", "not good", "cannot", "inconvenient" and "x". The examples of the term-expression indicating "put on hold" include "put on hold", "not sure", and "Δ".

Furthermore, the interpreter 341 also interprets whether the rough date, the purpose, and the number of people are included in the received message in response to the initial message.

The collector 342, upon success of the attempt made by the interpreter 341, collects the interpreted answer as the answer from the user who sends the message. For example, when the attempt made by the interpreter 341 is successful with respect to the received message in response to the inquiry message, the collector 342 stores, in the storage unit 330, the message in addition to the collected message group 332 as illustrated in FIG. 5B. In addition, when the attempt made by the interpreter 341 is successful with respect to the received message in response to the initial message, the collector 342 sets, in the above described arrangement setting information 331 as illustrated in FIG. 5A, information on the rough date, the purpose, and the number of people included in the message, and stores such in the storage unit 330.

Figure 6:
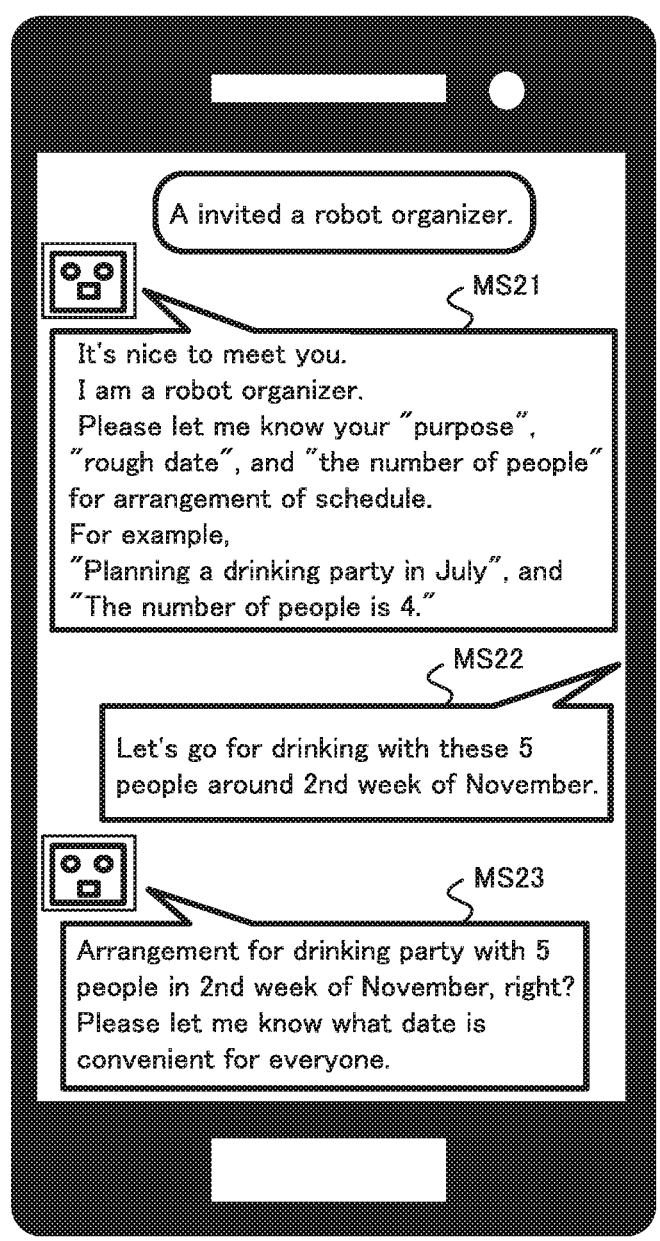
FIG. 6 is a schematic view of a specific example of messages including an initial message.

The generator 343 generates various types of messages to be transmitted to the user terminal 400 as the talk target. For example, when the server device 300 is invited as the bot, the generator 343 generates content to be arranged by the server device 300 as the initial message that is the first message for making an inquiry to the user for sending the inquiry to acquiring the user. In particular, the generator 343 generates the initial message MS21 as illustrated in FIG. 6. The generated initial message MS21 is transmitted to all of the user terminals 400 as talk targets by the inquiry transmitter 321.

Then when any one of the user terminals 400 to which the initial message MS21 is transmitted transmits a message MS22 as illustrated in FIG. 6, the interpreter 341 interprets whether the rough date, the purpose, and the number of people are included. Then when the interpreter 341 interprets that the rough date, the purpose, and the number of people are included (when the interpretation is successful), the information on the rough date, the purpose, and the number of people is set in the arrangement setting information 331 as illustrated in FIG. 5A.

Then the generator 343 generates the inquiry message for inquiry about what date is a convenient. In particular, the generator 343 generates an inquiry message MS23 as illustrated in FIG. 6. The generated inquiry message MS23 is transmitted to all of the user terminals 400 as the talk targets by the inquiry transmitter 321.

Figure 7:
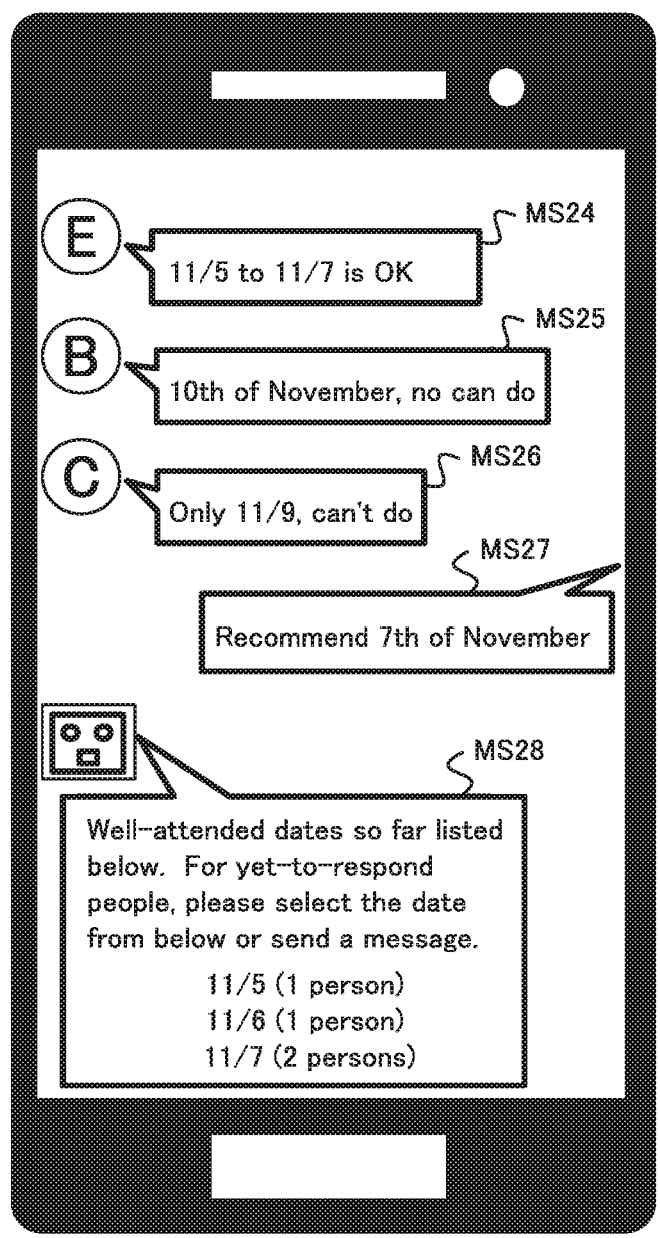
FIG. 7 is a schematic view of a specific example of messages including an inquiry message.

Then when some of the user terminals 400 to which the inquiry message MS23 is transmitted transmit the messages MS24 to MS27 as illustrated in FIG. 7, the interpreter 341 interprets whether the effective date or the effective date range is included in the messages, and further interprets whether a term-expression indicating "affirmative", "negative", or "put on hold" is included in the messages, in addition to the date or date range. When the interpreter 341 interprets that the effective date, the effective date range, or the like is included (when the interpretation is successful), the collector 342 collects these messages and stores the collected messages in addition to the above-described collected message group 332 as illustrated in the FIG. 5B.

Accordingly, the generator 343 generates the inquiry message directed to the yet-to-respond user with reference to the stored collected message group 332. In particular, the generator 343 generates an inquiry message MS28 as illustrated in FIG. 7. The generated inquiry message MS28 is transmitted to all of the user terminals 400 as the talk targets by the inquiry transmitter 321.

When the predetermined condition is satisfied in the state where the yet-to-respond user is present, the inquiry transmitter 321 transmits, as described above, the inquiry message MS28 to the user terminal 400 of the yet-to-respond user via the other messaging services such an e-mail. For example, when the yet-to-respond user is not signed in to the messaging service (the message management device 200), or even when the yet-to-respond user is signed in to the messaging service but transmits messages through the messaging service at a frequency lower than the standard value, the inquiry transmitter 321 transmits the inquiry message MS28 to the user terminal 400 of the yet-to-respond user via the other messaging services. In addition, in the interpreter 341, when the attempts to interpret the messages transmitted by the yet-to-respond user are not succeeding consecutively, and when the number of messages not succeeding successively or the volume of messages not succeeding successively exceeds a threshold, the inquiry transmitter 321 may transmit the inquiry message MS28 to the user terminal 400 of the yet-to-respond user via another messaging service.

In the manner described above, the arrangement of the effective messages from all of the user terminals 400 as the talk targets (more specifically, from a number of the user terminals 400 equal to the number of people 331c set in the arrangement setting information 331 illustrated in FIG. 5A) is completed after receiving the messages, the generator 343 generates a result message obtained by tallying the arrangement result. The generated result message is transmitted to all of the user terminals 400 as talk targets by the result transmitter 322.

The above-described CPU 501 or the like can function as the controlling unit 340 having the aforementioned configuration.

Operation of Server Device

Figure 8:
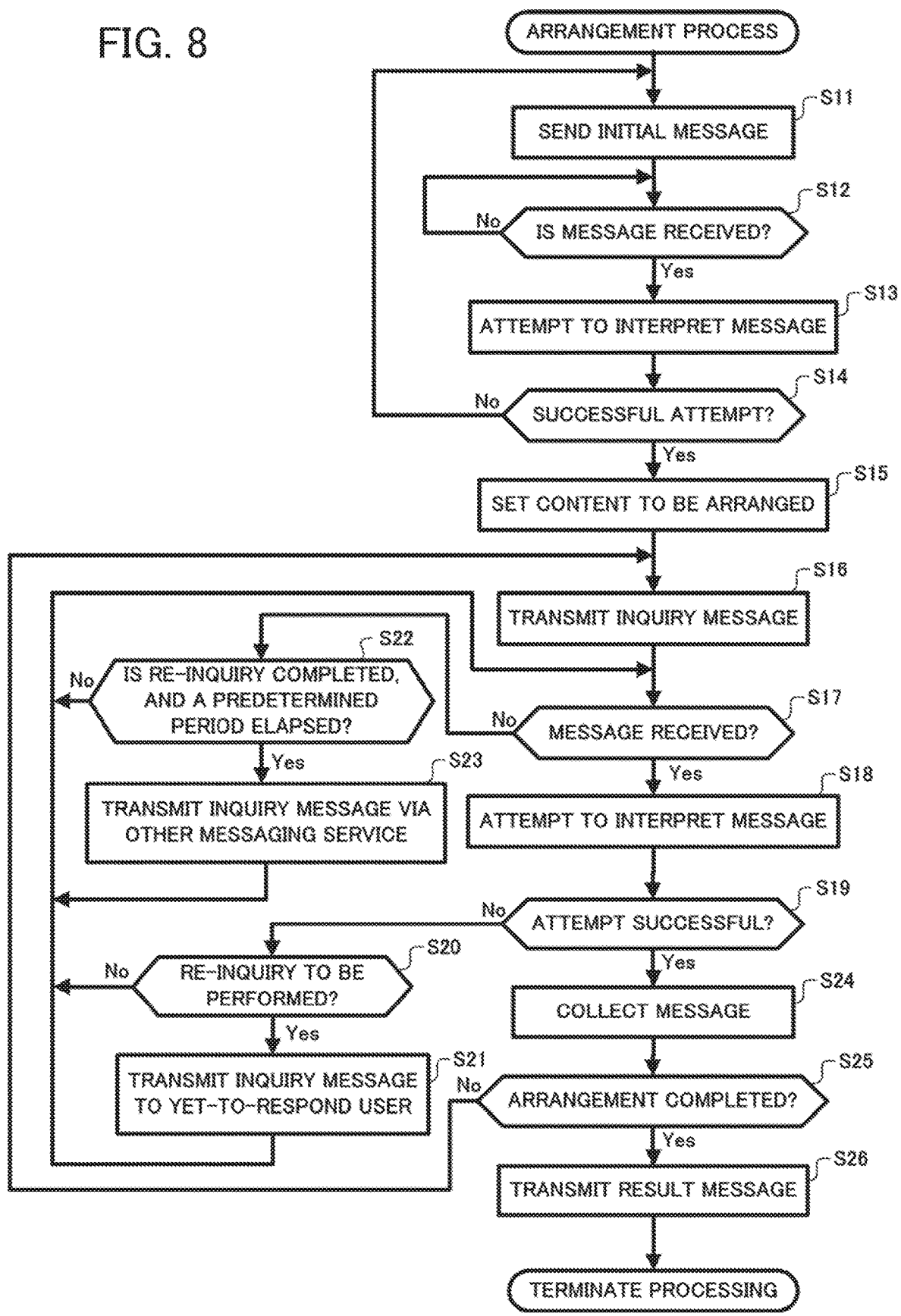
FIG. 8 is a flowchart for describing an arrangement process according to the present embodiment.

Hereinafter, the operation of the server device 300 having the configuration described above is described with reference to FIG. 8. FIG. 8 is a flowchart illustrating the arrangement process according to the present embodiment. This arrangement process starts when the server device 300 is invited as the bot to multi-person talk or group talk.

First, the server device 300 transmits the initial message (Step S11). For example, the controlling unit 340 (the generator 343) generates the initial message MS21 illustrated in FIG. 6. Then the transmitting unit 320 (the inquiry transmitter 321) transmits the generated initial message MS21 to all of the user terminals 400 as the talk targets.

The server device 300 determines whether the message that is sent from any one of the user terminals 400 to which the initial message is transmitted is received (Step S12). Upon determination that the message is not received (NO in step S12), the server device 300 waits for reception of the message as is.

Alternatively, upon determination that the message is received (YES in step S12), the server device 300 attempts to interpret the message (step S13). For example, upon reception of the message MS22 as illustrated in FIG. 6 in step S12, the controlling unit 340 (the interpreter 341) interprets whether the rough date, the purpose, and the number of people are included in the message MS22.

The server device 300 determines whether the attempt is successful (step S14). Upon determination that the attempt is unsuccessful (attempt is not succeeding) (NO in step S14), the process execution by the server device 300 returns to the above-described step S11.

Alternatively, when the server device 300 determines that the attempt is successful (YES in step S14), the server device 300 sets the contents to be arranged (step S15). For example, the controlling unit 340 (the collector 342) sets information on the rough date (November, 2nd Week), the purpose (drinking party), and the number of people (5 people) included in the message MS22 illustrated in FIG. 6 in the arrangement setting information 331 illustrated in FIG. 5A and stores the information in the storage unit 330. The "drinking party" that is information for the purpose is converted from "Let's go drinking" included in the message MS22 to a common notation.

The server device 300 transmits the inquiry message (Step S16). For example, the controlling unit 340 (the generator 343) generates the inquiry message MS23 illustrated in FIG. 6. Then, the transmitting unit 320 (the inquiry transmitter 321) transmits the generated inquiry message MS23 to all of the user terminals 400 as the talk targets.

The server device 300 determines whether the message sent from any one of the user terminals 400 to which the inquiry message is sent, is received (step S17). Upon determination that the message is not received (NO in step S17), processing by the server device 300 proceeds to the below-described Step S22.

Alternatively, upon determination that the message is received (YES in step S17), the server device 300 attempts to interpret the message (Step S18). For example, upon simultaneous reception of the messages MS24 to MS27 in step S17 as illustrated in FIG. 7, the controlling unit 340 (the interpreter 341) interprets whether each of the messages MS24 to MS27 includes the effective date or the effective date range, or whether a term-expression that indicates "affirmative", "negative", or "put on hold" is included in addition to the date and the date range.

The server device 300 determines whether the attempt is successful (step S19). Upon determination that the attempt is unsuccessful (attempt is not succeeding) (NO in step S19), the server device 300 determines whether a re-inquiry is to be performed (step S20). For example, the controlling unit 340 determines that the re-inquiry is required when a frequency that the message is transmitted through the messaging service is lower than the standard value. In addition, the controlling unit 340 determines that the re-inquiry is to be performed when, in step S19, the attempted messages that are sent from the yet-to-respond user is not succeeding successively, and when the number of messages not succeeding successively or the amount of the messages not succeeding successively exceeds the threshold value. Upon determination that the re-inquiry is not to be performed (NO in step S20), processing of the server device 300 returns to the above-described step S17.

In contrast, upon determination that the re-inquiry is to be performed (YES in step S20), the server device 300 transmits the inquiry message to the user terminal 400 of the yet-to-respond user (step S21). For example, the transmitting unit 320 (the inquiry transmitter 321) transmits the inquiry message MS11 when the interpretation attempts of messages MS1, MS2, MS3, . . . MS10 as illustrated in the above described FIG. 4 are not succeeding, as one example, ten times consecutively. That is, the attempt not succeeding to interpret the messages consecutively indicates that the subject of the conversation may be veering from the content of the inquiry without answering. Thus by transmitting the inquiry message, the subject of the conversation can be brought back to the inquiry content to be answered. Then, processing by the server device 300 returns to the above-described step S17.

Upon determination in the above-described step S17 that the message is not received (NO in step S17), the server device 300 determines whether the re-inquiry is completed and whether the predetermined period is elapsed (Step S22). That is, the server device 300 determines in the above-described step S21 whether the transmission of the inquiry message is completed, and thereafter, whether a predetermined period elapses without receiving an answer. Upon determination that the re-inquiry is not completed, or determination that the predetermined period is not elapsed (NO in step S22), processing by the server device 300 returns to the above-described step S17.

In contrast, upon determination that the re-inquiry is completed and the predetermined period is elapsed (YES in step S22), the server device 300 transmits the inquiry message via the other messaging services (Step S23). For example, the transmitting unit 320 (the inquiry transmitter 321) transmits the inquiry message to the user terminal 400 of the yet-to-respond user via other messaging services such as an e-mail and SMS. Then, processing by the server device 300 returns to the above-described step S17.

Upon determination of success of the attempt in the above-described step S19 (YES in step S19), the server device 300 collects the message (step S24). For example, the controlling unit 340 (the collector 342) collects the messages MS24 to MS27 as illustrated in FIG. 7 and adds the collected messages to the collected message group 332 as illustrated in FIG. 5B.

The server device 300 determines whether the arrangement is completed (step S25). For example, the controlling unit 340 determines that the arrangement is completed when effective messages are collected from all of the user terminals 400 as the talk targets (more specifically, from the number of the user terminals 400 equal to the number of people 331c set in the arrangement setting information 331 illustrated in FIG. 5A).

When the arrangement is determined to be incomplete (NO in step S25), processing by the server device 300 returns to the above-described step S16. In the second or later iteration of step S16, the inquiry message directed to the yet-to-respond user is transmitted with reference to the collected message group 332. For example, the controlling unit 340 (the generator 343) generates the inquiry message MS28 illustrated in FIG. 7. Then, the transmitting unit 320 (the inquiry transmitter 321) transmits to the user terminals 400 including the user terminal 400 of the yet-to-respond user.

In contrast, upon determination that the arrangement is completed (YES in step S25), the server device 300 transmits the result message (step S26). That is, the controlling unit 340 (the generator 343) generates the result message obtained by tallying the arrangement result. Then, the transmitting unit 320 (the result transmitter 322) transmits the result message to all of the user terminals 400 as the talk targets.

Although omitted from the arrangement process of FIG. 8, when any one of the user terminals 400 as the talk target transmits the message including a specific keyword expression, the contents to be arranged can be reset, or the bot can leave. For example, when the user terminal 400 transmits the message including a keyword expression such as "do over", "from the start", "one more time", and "clear", the server device 300 cancels the arrangement setting information 331 illustrated in FIG. 5A, and then processing returns to step S11 illustrated in FIG. 8. In addition, when the user terminal 400 transmits the message including a keyword expression such as "allow the robot to leave", "robot leaves", "allow the robot organizer to leave", "the robot organizer leaves", "good-bye to the robot organizer", and "good-bye robot", the server device 300 leaves the multi-person talk or the group talk.

With such an arrangement process, the date or the like of the event can be arranged by obtaining an effective answer from all of the user terminals 400 as talk targets through message communication in the messaging service. Thus, this enables an efficient collection of the answers to the question from all of the users.

Other Embodiments

Figure 9:
FIG. 9 is a schematic view of a specific example of inputting of the date from a calendar.

Although a case has been described in the above-described embodiments where the user of the user terminal 400 transmits a message including the date, the date range, or the like as the messages MS24 to MS27 as illustrated in FIG. 7, the date, the date range or the like can be transmitted by using a calendar function or the like. For example, the user terminal 400 is caused to display a calendar screen WD1 illustrated in FIG. 9; therefore the user can select a date or a date range, and further can select and transmit "OK", "on hold", "no can do" or the like. This calendar screen WD1 can be displayed, for example, by tapping on a link included in the inquiry message the server device 300 transmits.

Although a case has been described in the above-described embodiments where, in the later steps in which the bot participates in multi-person talk or group talk, the server device 300 suitably interprets and arranges the message transmitted by each user terminal 400, the users actually often, before the participation of the bot, exchange messages with respect to the contents to be arranged in advance. Thus when the bot participates in the multi-person talk or the group talk, the server device 300 can be configured to obtain the message, from the message management device 200, transmitted or received within a preceding predetermined period prior to the participation point, and utilize the message transmitted or received before the participation for arrangement. Hereinafter, the server device 300 characterized in that the message transmitted or received before the participation of the bot can be utilized is described with reference to FIG. 10.

Figure 10:
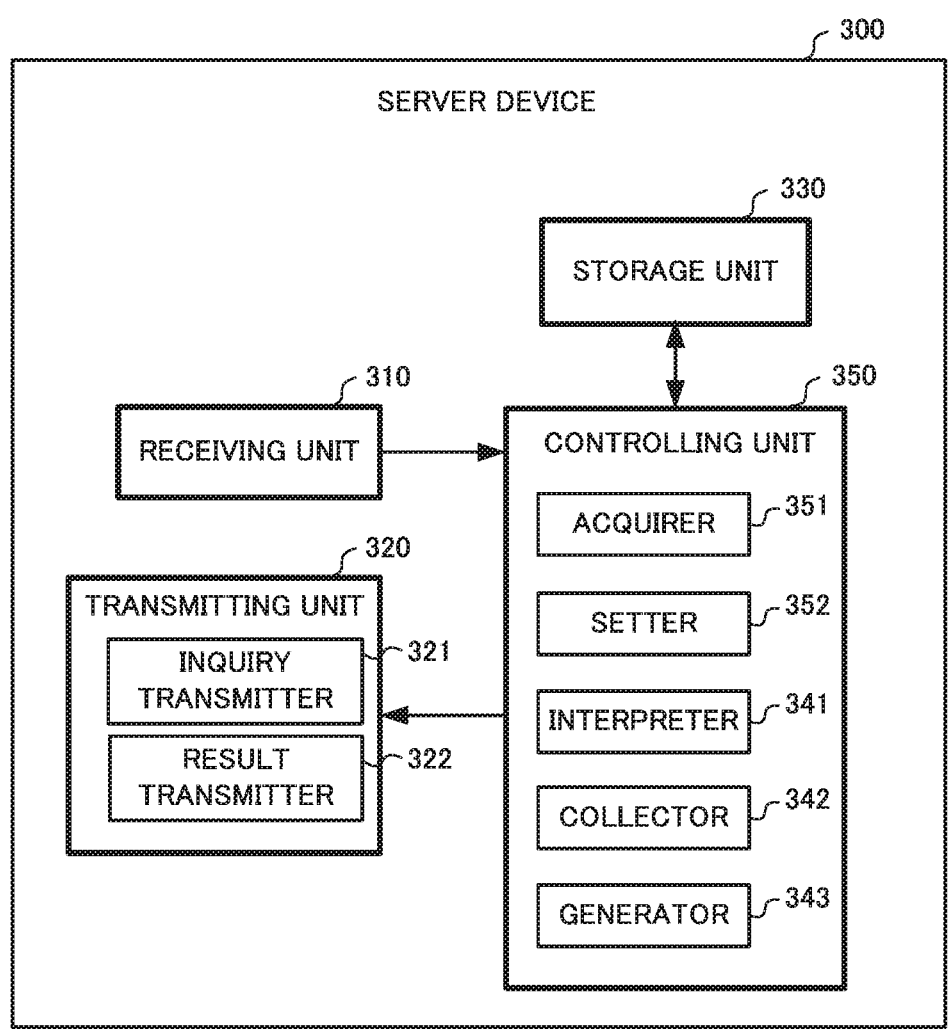
FIG. 10 is a block diagram of an example of a general configuration of a server device according to other embodiments.

FIG. 10 is a block diagram illustrating an example of a general configuration of the server device 300 according to other embodiments. As illustrated in FIG. 10, the server device 300 includes the receiving unit 310, the transmitting unit 320, the storage unit 330, and a controlling unit 350. The receiving unit 310, the transmitting unit 320 and the storage unit 330 have the same configurations as in the server device 300 illustrated in FIG. 3.

The controlling unit 350 includes the acquirer 351, the setter 352, the interpreter 341, the collector 342, and the generator 343. The interpreter 341, the collector 342, and the generator 343 have the same configuration as the server device 300 as illustrated in the above-described FIG. 3 has.

When the server device 300 is invited as the bot and participates in the multi-person talk or the group talk, the acquirer 351 acquires, from the message management device 200, the message in the conversation transmitted or received in the conversation within a preceding predetermined period after the participation point.

The setter 352 sets a question based on the message acquired by the acquirer 351. For example, the setter 352 causes the interpreter 341 to attempt, in chronological order, interpretation of the message acquired by acquirer 351. At that time, the interpreter 341 first interprets whether a rough date, the purpose, and the number of people are included in the message. Then upon interpretation, by the interpreter 341, that the rough date, the purpose, and the number of people are included, the setter 352 sets, in the arrangement setting information 331 illustrated in FIG. 5A, information on the rough date, the purpose, and the number of people included in the message and stores such set information in the storage unit 330. Thereafter, the interpreter 341 interprets whether the effective date, effective date range, or the like are included in the message. Then when the interpreter 341 interprets that the effective date, the effective date range, or the like are included, the setter 352 adds the message in the collected message group 332 illustrated in FIG. 5B to store thus obtained collected message group 332 in the storage unit 330. Then when the storage unit 330 stores, after completion of the interpretation by the interpreter 341, of the message acquired by the acquirer 351, the arrangement setting information 331 and the collected message group 332 by the setter 352, the generator 343 immediately generates the inquiry message directed to the yet-to-respond user with reference to the stored collected message group 332. Specifically, the generator 343 skips the generation of the initial message or the like to immediately generate the inquiry message MS28 illustrated in FIG. 7. The generated inquiry message MS28 is transmitted to all of the user terminals 400 as the talk targets by the inquiry transmitter 321.

According to the server device 300 of the other embodiments described above, the date of the event or the like can quickly be arranged by utilizing the message transmitted to or received before the participation of the bot.

INDUSTRIAL APPLICABILITY

As described above, the present invention can provide the server device, a servicing method, and a program that allow an efficient collection of the answers to a question from all of the users.

REFERENCE SIGNS LIST

100 Messaging system
200 Message management device
300 Server device
310 Receiving unit
320 Transmitting unit
321 Inquiry transmitter
322 Result transmitter
330 Storage unit
340, 350 Controlling unit
341 Interpreter
342 Collector
343 Generator
351 Acquirer
352 Setter
400 User terminal
500 Information processing device
501 CPU
502 ROM
503 RAM
504 NIC
505 Image processor
506 Audio processor
507 DVD-ROM drive
508 Interface
509 External memory
510 Controller
511 Monitor
512 Speaker
900 Internet

The invention claimed is:
1. A server device comprising:
at least one memory configured to store computer program code;
at least one processor configured to access the computer program code and operate as instructed by the computer program code, the computer program code including:
bot code configured to cause at least one of the at least one processor to provide a bot in a messaging service where a message between users and the bot is shared, the bot being configured to set a question;
receiving code configured to cause at least one of the at least one processor to receive the message transmitted from any one of the users;
interpreter code configured to cause at least one of the at least one processor to attempt to interpret the received message as an answer to the question;
collector code configured to cause at least one of the at least one processor to, upon success of the attempt, collect the interpreted answer as an answer from a user who sends the message that is received;
inquiry transmitter code configured to cause at least one of the at least one processor to, when a frequency of transmission of the message through the messaging service by the yet-to-respond user is lower than a standard value in a state where a yet-to-respond user is present, transmit an inquiry about the question to at least the yet-to-respond user whose answer is not yet collected by the collector; and
result transmitter code configured to cause at least one of the at least one processor to, after the answer from the user is collected from all of the users, transmit a message to the users via the messaging service, the transmitted message indicating a result obtained by tallying the answer.

2. The server device according to claim 1,
wherein the inquiry transmitter code is configured to cause at least one of the at least one processor to transmit the inquiry to the yet-to-respond user when the attempt to interpret the message that is transmitted from the yet-to-respond user is not succeeding successively, and (i) a number of messages not succeeding successively, or (ii) an amount of the messages not succeeding successively, exceeds a threshold.

3. The server device according to claim 2,
wherein, upon transmission of the inquiry, the number of messages not succeeding successively, or the amount of the messages not succeeding successively is cleared.

4. The server device according to claim 1,
wherein the inquiry transmitter code is configured to cause at least one of the at least one processor to transmit the inquiry to the yet-to-respond user via another messaging service that is different from the messaging service.

5. The server device according to claim 1,
wherein, when the yet-to-respond user is not signed in to the messaging service, the inquiry transmitter code configured causes at least one of the at least one processor to transmit the inquiry to the yet-to-respond user via the other messaging service that is different from the messaging service.

6. The server device according to claim 1, further comprising:
acquirer code configured to cause at least one of the at least one processor to acquire, when the bot participates in the messaging service, the message transmitted to or received from the users before the participation; and
setter code configured to cause at least one of the at least one processor to set the question based on the acquired message.

7. A servicing method performed by a server device comprising:
- providing a bot in a messaging service where a message transmitted to or received from users and the bot is shared, the bot being configured to set a question;
- receiving by the server device, the message transmitted from any one of the users;
- interpreting by the server device, attempts to interpret the received message as an answer to the question;
- collecting by the server device, upon success of one of the attempts, the interpreted answer as an answer from a user who sends the message that is received;
- transmitting by the server device, when a frequency of transmission of the message through the messaging service by the yet-to-respond user is lower than a standard value in a state where a yet-to-respond user is present, an inquiry about the question to at least a yet-to-respond user whose answer is not yet collected; and
- transmitting by the server device, after the answer from the user is collected from all of the users, a message to the users via the messaging service, indicating a result obtained by tallying the answer.

8. A nontransitory computer readable storage medium storing a program for causing a computer to:
- provide a bot in a messaging service where a message transmitted to or received from users and the bot is shared, the bot being configured to set a question;
- receive the message transmitted from any one of the users;
- attempt to interpret the received message as an answer to the question;
- upon success of the attempt, collect the interpreted answer as an answer from a user who sends the message that is received;
- when a frequency of transmission of the message through the messaging service by the yet-to-respond user is lower than a standard value in a state where a yet-to-respond user is present, transmit an inquiry about the question to at least a yet-to-respond user whose answer is not yet collected by the collector; and
- after the answer from the user is collected from all of the users, transmit a message to the users via the messaging service, the transmitted message indicating a result obtained by tallying the answer.

\* \* \* \* \*